Patented Feb. 13, 1951

2,541,106

UNITED STATES PATENT OFFICE 2,541,106

PREGNANE DERIVATIVES AND PROCESS

Lewis Hastings Sarett, Princeton, N. J., assignor to Merck & Co., Inc., Rahway, N. J., a corporation of New Jersey No Drawing. Application February 12, 1949, Serial No. 76,205

22 Claims. (Cl. 260—397.4)

This invention is concerned generally with steroid compounds and with processes for preparing them. More particularly, it relates to an improved method for converting $\Delta^{17}$-20-cyano-pregnene compounds containing one or more nuclear hydroxy groupings to the corresponding keto-substituted 17($a$)-hydroxy-20-keto-pregnanes.

This application is a continuation-in-part of my co-pending application Serial No. 778,465 filed October 7, 1947 which, in turn, is a continuation-in-part of my co-pending application Serial No. 773,525, filed September 11, 1947. I have disclosed in these parent applications that, when a $\Delta^{17}$-20-cyano-pregnene compound is treated with osmium tetroxide and the intermediate osmate ester reacted with a hydrolyzing agent, there is obtained the corresponding 17($a$)-hydroxy-20-keto-pregnane compound. The 17-hydroxy group, introduced according to this novel method, is obtained, surprisingly enough, in only one isomeric form, namely the "$a$" or "natural" configuration; i. e. the "$a$" hydroxy groupings in the compounds thus obtained have the same stereochemical configuration as that present in many of the naturally-occurring adrenal hormones. This is of especial interest in the preparation of pregnene-4-diol-17($a$),21-trione-3,11,20 (commonly known as Kendall's compound E), and its 21-acyl derivatives. These compounds are important as adrenal hormones or in therapy requiring adrenal hormone type compounds. They are further useful in the synthesis of similar hormones and compounds.

When a $\Delta^{17}$-20-cyano-pregnene compound containing nuclear hydroxy substituents is treated with osmium tetroxide and the intermediate osmate ester is reacted with a hydrolyzing agent, the product obtained is the corresponding hydroxy-substituted 17($a$)-hydroxy-20-keto-pregnane. In the preparation of adrenal hormones, such as compound E, it is ordinarily desired, however, to prepare 17($a$)-hydroxy-20-keto-pregnane compounds containing keto substituents attached to the perhydrophenanthrene nucleus. It was therefore an object of this invention to accomplish the conversion of $\Delta^{17}$-20-cyano-pregnene compounds having one or more nuclear hydroxy substituents to the corresponding 17($a$)-hydroxy-20-keto-pregnane compound wherein said nuclear hydroxy substituents have been oxidized to keto radicals. A further object was to accomplish the oxidation of said nuclear hydroxy radicals by a procedure which would not cause destructive oxidation of other portions of the steroid molecule and which would make possible the preparation of the desired nuclear keto-substituted 17($a$)-hydroxy-20-keto-pregnane compounds from the corresponding nuclear-hydroxylated $\Delta^{17}$-20-cyano-pregnene compounds in good yield and in a relatively high state of purity.

I have found that this conversion can be accomplished by reacting osmium tetroxide with a $\Delta^{17}$-20-cyano-pregnene compound which has at least one nuclear hydroxy substituent (and which may have an acyloxy substituent attached to the C-21 carbon atom) to form the 17,20-osmate ester of the corresponding nuclear-hydroxylated 17,20-dihydroxy-20-cyano-pregnane compound, reacting this compound with an oxidizing agent thereby oxidizing said nuclear hydroxy substituent to a keto radical, and reacting the resulting keto-substituted osmate ester with a hydrolyzing agent. Moreover, the oxidation reaction utilized in this conversion is accomplished with no appreciable destructive oxidation of other portions of the steroid molecule.

It is indeed unexpected that this oxidation of nuclear hydroxy substituents in 17,20-osmate esters of 17,20-dihydroxy-20-cyano-pregnane compounds can be carried out without affecting the osmate ester linkages since the 17,20-osmate group is ordinarily extremely sensitive to oxidizing agents, such as chromic acid. For example, when the 17,20-osmate ester of 3($a$),17,20-trihydroxy-11-keto-pregnane is oxidized with chromic acid under conditions operative for the oxidation of the corresponding 20-cyano-derivative described in this application, none of the expected 17,20-osmate of 3,11-diketo-17,20-dihydroxy-pregnane is formed. I have discovered, however, that when the C-20 carbon atom of the osmate ester is attached to a cyano radical, the osmate ester is, surprisingly enough, very stable to oxidizing agents. These 17,20-osmate esters of 20-cyano-17,20-dihydroxy-pregnane compounds containing secondary nuclear hydroxyl groupings can therefore be oxidized to the corresponding derivative wherein the nuclear hydroxyl groups are converted to keto radicals with no appreciable loss in yield due to destructive oxidation of the 17,20-osmate grouping.

The $\Delta^{17}$-20-cyano-pregnene compounds having at least one nuclear hydroxy substituent, which are utilized as starting materials in carrying out the present invention may be prepared as described in my co-pending application Serial No. 77,268, filed February 18, 1949. Examples of these starting materials are: $\Delta^{17}$-3-hydroxy-20-cyano-pregnene, $\Delta^{17}$-3($a$)-hydroxy-11-keto-20-cyano-pregnene, $\Delta^{17}$-3,12-dihydroxy-20-cyanopregnene, $\Delta^{17}$-3($\alpha$)-hydroxy-20-cyano-21-acetoxy-pregnene, $\Delta^{17}$-3,12-dihydroxy-20-cyano-21-acetoxy-pregnene, $\Delta^{17}$-3($\alpha$)-hydroxy-11-keto-20-cyano-21-acetoxy-pregnene, and the like.

These $\Delta^{17}$-20-cyano-pregnene compounds having at least one nuclear hydroxy substituent are treated with osmium tetroxide, preferably in the presence of an organic solvent such as pyridine, thereby forming the 17,20-osmate ester of the corresponding nuclear hydroxylated 17,20-dihydroxy-20-cyano-pregnane compound, such as the 17,20-osmate ester of 3,17,20-trihydroxy-20-cyano-pregnane, the 17,20-osmate ester of 3($\alpha$),-17,20-trihydroxy-11-keto-20-cyano-pregnane, the 17,20-osmate ester of 3,12,17,20-tetrahydroxy-20-cyano-pregnane, the 17,20-osmate ester of 3($\alpha$),-17,20-trihydroxy-20-cyano-21-acetoxy-pregnane, the 17,20-osmate ester of 3,12,17,20-tetrahydroxy-20-cyano-21-acetoxy-pregnane, the 17,20-osmate ester of 3($\alpha$),17,20-trihydroxy-11-keto-20-cyano-21-acetoxy-pregnane, and the like.

The oxidation of the nuclear hydroxy substituents in these 17,20-osmate esters of nuclear hydroxylated 17,20-dihydroxy-20-cyano-pregnane compounds can be accomplished using strong oxidizing agents such as chromic acid, potassium permanganate, hypobromous acid, and the like. The oxidation is usually conducted employing chromic acid, preferably chromic acid in acetic acid solution. The reaction is conveniently carried out at room temperature, under which conditions, the reaction is substantially complete in about 30 minutes. The reaction mixture is diluted with a solvent such as methanol then neutralized with a mildly alkaline substance such as aqueous potassium bicarbonate and the solvent and carbon dioxide evaporated from the neutralized solution in vacuo. The aqueous solution may be further evaporated to produce the 17,20-osmate ester of the corresponding 17,20-dihydroxy-20-cyano-pregnane compound wherein the nuclear hydroxy substituents have been oxidized to keto radicals. Examples of these nuclear keto-substituted 17,20-osmate esters of 17,20-dihydroxy-20-cyano-pregnane compounds obtained by oxidation of the nuclear hydroxylated 17,20-osmate esters previously enumerated include: the 17,20-osmate ester of 3-keto-17,20-dihydroxy-20-cyano-pregnane, the 17,20-osmate ester of 3,11-diketo-17,20-dihydroxy-20-cyano-pregnane, the 17,20-osmate ester of 3,12-diketo-17,20-dihydroxy-20-cyano-pregnane, the 17,20-osmate ester of 3-keto-17,20-dihydroxy-20-cyano-21-acetoxy-pregnane, the 17,20-osmate ester of 3,12-diketo-17,20-dihydroxy-20-cyano-21-acetoxy- pregnane, the 17,20-osmate ester of 3,11-diketo-17,20-dihydroxy-20-cyano-21-acetoxy-pregnane, and the like.

The 17,20-osmate ester of the nuclear keto-substituted 17,20-dihydroxy-20-cyano-pregnane compound, thus prepared, is reacted with a hydrolyzing agent. Instead of isolating the osmate ester, however, the oxidation reaction solution may be used, after neutralization, in this hydrolysis operation. The preferred hydrolyzing agent comprises aqueous sodium sulfite and potassium bicarbonate and the hydrolysis reaction is conveniently carried out at room temperature. Under these preferred hydrolysis conditions the reaction is substantially complete in approximately 15 hours. The reaction mixture is filtered, evaporated to small volume and extracted with chloroform. The chloroform extract is then evaporated to dryness to produce the corresponding 17($\alpha$)-hydroxy-20-keto-pregnane compound having at least one nuclear keto substituent as, for example: 3,20-diketo-17($\alpha$)-hydroxy-pregnane, 3,11,20-triketo-17($\alpha$)-hydroxy-pregnane, 3,12,20-triketo-17($\alpha$)-hydroxy-pregnane, 3,20-diketo-17($\alpha$),21-dihydroxy-pregnane, 3,12,20-triketo-17($\alpha$),21-dihydroxy-pregnane, 3,11,20-triketo-17($\alpha$),21-dihydroxy-pregnane, and the like.

When the 17,20-osmate ester of the nuclear keto-substituted 17,20-dihydroxy-20-cyano-pregnane compound contains a 21-acyloxy substituent, the hydrolysis operation described above can be carried out under mild conditions of hydrolysis thereby hydrolyzing the 17,20-osmate ester linkages without affecting the acyloxy substituent attached to the C–21 carbon atom thereby producing the corresponding 17($\alpha$)-hydroxy-20-keto-21-acyloxy-pregnane having at least one nuclear keto substituent, such as 3,20-diketo-17($\alpha$)-hydroxy-21-acetoxy-pregnane, 3,12,20-triketo-17($\alpha$)-hydroxy-21-acetoxy-pregnane, 3,11,20-triketo-17($\alpha$)-hydroxy-21-acetoxy-pregnane, and the like.

Alternatively, a 17($\alpha$)-hydroxy-20-keto-21-hydroxy-pregnane having at least one nuclear keto substituent, prepared according to the first hydrolysis procedure described above, can be treated with an acylating agent, such as acetic anhydride and pyridine, to produce the corresponding nuclear keto-substituted 17($\alpha$)-hydroxy-20-keto-21-acyloxy-pregnane.

The following examples illustrate methods of carrying out the present invention, but it is to be understood that these examples are given by way of illustration and not of limitation.

*Example 1*

429 mg. of $\Delta^{17}$-3($\alpha$)-hydroxy-11-keto-20-cyano-21-acetoxy-pregnene (which can be prepared as described in my copending application Serial No. 77,268, filed February 18, 1949) was dissolved in 4 cc. of benzene and 600 mg. of osmium tetroxide and 0.30 cc. of pyridine were added to this benzene solution. The resulting mixture was allowed to stand at room temperature for about 15 hours. The reaction solution was then evaporated to dryness in vacuo to produce the 17,20-osmate ester of 3($\alpha$),17($\alpha$),20-trihydroxy-11-keto-20-cyano-21-acetoxy-pregnane, which was obtained as an amorphous residue.

The osmate ester, prepared as described above, was dissolved in 5 cc. of 90% acetic acid and this solution was treated with cooling with 1.05 cc. of acetic acid containing 3.52 milli-equivalents of sulfuric acid. A solution containing 250 mg. of chromic acid in 4.4 cc. of 90% acetic acid was added to the solution of the osmate ester, and the resulting solution was allowed to stand at room temperature for 30 minutes. 2 cc. of methanol was added to the reaction mixture and the resulting mixture was poured into a suspension of 5 gms. of potassium bicarbonate in 20 cc. of water. The resulting mixture was evaporated under reduced pressure, thereby removing methanol and carbon dioxide. The resulting aqueous solution may be evaporated to produce crude 17,20-osmate ester of 3,11-diketo-17($\alpha$),20-dihydroxy-20-cyano-21-acetoxy-pregnane.

The aqueous solution of the osmate ester was treated with a solution containing 2.0 gms. of sodium sulfite and 2.0 gms. of potassium bicarbonate dissolved in 10 cc. of water, together with 10 cc. of benzene. The resulting mixture was stirred for about 15 hours, filtered and evaporated to one-half its volume under reduced pressure, extracted with chloroform and the organic layer evaporated to dryness. The crystalline product thus obtained consisted of 3,11,20-triketo-17(α), 21-dihydroxy-pregnane; M. P. 233–235° C.

When the reaction described in the preceding paragraph was carried out employing 60 cc. of benzene instead of 10 cc. and the mixture was stirred for eight hours instead of 15 hours, the osmate ester grouping was hydrolyzed without affecting the acetoxy group in the 21-position, thereby producing as end product 3,11,20-triketo-17(α) - hydroxy - 21 - acetoxy - pregnane; M. P. 223° C.

The 3,11,20-triketo-17(α),21-dihydroxy - pregnane, obtained according to the first hydrolysis procedure described above, was dissolved in 2 cc. of pyridine and 2 cc. of acetic anhydride was added to the resulting solution. The mixture was allowed to stand for 30 minutes and water was added to the reaction mixture thus formed thereby precipitating crystalline 3,11,20-triketo-17(α) - hydroxy - 21 - acetoxy - pregnane; M. P. 223° C.

*Example 2*

1 g. of $\Delta^{17}$-3(α)-hydroxy-11-keto-20-cyano-pregnene (which can be prepared as described in my co-pending application Serial No. 77,268, filed February 18, 1949) was dissolved in 10 cc. of benzene and to this solution was added 1.0 gm. of osmium tetroxide and 0.6 cc. of pyridine. The resulting mixture was allowed to stand at room temperature for about 15 hours. The benzene was evaporated under reduced pressure from the reaction mixture thus obtained. The residual material was dissolved in 10.5 cc. of acetic acid and 2.21 cc. of acetic acid containing 3.52 milliequivalents of sulfuric acid per cc. was added to this solution. The resulting solution was cooled to 15° C., 9.2 cc. of 90% acetic acid containing 420 mg. of chromic acid was added thereto and the resulting mixture was allowed to stand for 1 hour. About 4 cc. of methanol was added to the reaction mixture and the mixture was poured into a mixture of 40 cc. of water and 31.5 g. of potassium bicarbonate. The aqueous mixture was evaporated under reduced pressure at a temperature of 30° C., thereby removing the methanol and carbon dioxide.

An aqueous solution containing 4.0 gms. of potassium bicarbonate and 4.0 gms. of sodium sulfite was added together with 20 cc. of benzene to the foregoing solution. The resulting mixture was stirred for 5 hours, 40 cc. of methanol and 20 cc. of benzene was added, and the resulting mixture was stirred for 15 hours. The resulting mixture was filtered, the filtrate was acidified to pH 6 and the methanol was evaporated therefrom under reduced pressure. The resulting aqueous solution was extracted four times with chloroform and the chloroform extract was washed with water. The chloroform solution was evaporated under reduced pressure to produce 700 mg. of 3,11,20-triketo-17(α)-hydroxy - pregnane; M. P. 198–199° C.

Various changes may be made in carrying out the present invention without departing from the spirit and scope thereof. Insofar as these changes and modifications are within the purview of the annexed claims, they are to be considered as part of my invention.

I claim:

1. The process which comprises reacting osmium tetroxide with a $\Delta^{17}$-pregnene compound having a cyano radical attached to the C-20 carbon atom and having at least one nuclear hydroxy substituent, reacting the osmate ester thus obtained with an oxidizing agent thereby oxdizing said nuclear hydroxy substituent to a keto radical, and reacting the resulting keto-substituted osmate ester with a hydrolyzing agent.

2. The process which comprises reacting osmium tetroxide with a $\Delta^{17}$-pregnene compound having a cyano radical attached to the C-20 carbon atom and having at least one nuclear hydroxy substituent, reacting the osmate ester thus obtained with chromic acid thereby oxidizing said nuclear hydroxy substituent to a keto radical, and reacting the resulting keto-substituted osmate ester with a hydrolyzing agent comprising aqueous sodium sulfite.

3. The process which comprises reacting osmium tetroxide with a $\Delta^{17}$-pregnene compound, having at least one nuclear hydroxy substituent and having a grouping of the formula $$=C(CN)CH_3$$

attached to the C-17 carbon atom, to form the 17,20-osmate ester of the corresponding nuclear-hydroxylated 17,20-dihydroxy-20-cyano - pregnane compound, reacting this compound with an oxidizing agent thereby oxidizing said nuclear hydroxy substituent to a keto radical to produce the 17,20-osmate ester of the corresponding keto-substituted 17,20-dihydroxy-20-cyano-pregnane compound, and reacting this compound with a hydrolyzing agent.

4. The process which comprises reacting osmium tetroxide with a $\Delta^{17}$-20-cyano-21-acyloxy-pregnene compound having at least one nuclear hydroxy substituent, reacting the osmate ester thus obtained with an oxidizing agent thereby oxidizing said nuclear hydroxy substituent to a keto radical, and reacting the resulting keto-substituted osmate ester with a hydrolyzing agent.

5. The process which comprises reacting osmium tetroxide with a $\Delta^{17}$-3-hydroxy-11-keto-20-cyano-21-acyloxy-pregnene, reacting the osmate ester thus produced with an oxidizing agent thereby oxidizing the 3-hydroxy substituent to a keto radical, and reacting the resulting keto-substituted osmate ester with a hydrolyzing agent.

6. The process which comprises reacting osmium tetroxide with a $\Delta^{17}$-20-cyano-21-acyloxy-pregnene compound having at least one nuclear hydroxy substituent to form the 17,20-osmate ester of the corresponding nuclear-hydroxylated 17,20-dihydroxy - 20 - cyano-pregnane compound, reacting this compound with chromic acid thereby oxidizing said nuclear hydroxy substituent to a keto radical to produce the 17,20-osmate ester of the corresponding keto substituted 17,20-dihydroxy-20-cyano pregnane compound, and reacting this compound with a hydrolyzing agent comprising aqueous sodium sulfite.

7. The process which comprises reacting osmium tetroxide with $\Delta^{17}$-3(α)-hydroxy-keto-20-cyano-pregnene to form the 17,20-osmate ester of 3(α),17,20-trihydroxy-11 - keto - 20 - cyano-pregnane, reacting this osmate ester with chromic acid to produce the 17,20-osmate ester of 3,11-diketo-17,20 - dihydroxy-20-cyano-pregnane, and reacting this compound with a hydrolyzing agent comprising aqueous sodium sulfite to produce 3,11,20-triketo-17(α)-hydroxy-pregnane.

8. The process which comprises reacting osmium tetroxide with $\Delta^{17}$-3-hydroxy-20-cyano-21-acetoxy-pregnene to form the 17,20-osmate ester of 3,17,20-trihydroxy-20-cyano-21-acetoxy-pregnane, reacting this osmate ester with chromic acid to produce the 17,20-osmate ester of 3-keto-17,20-dihydroxy-20-cyano-21-acetoxy-pregnane, and reacting this compound with a hydrolyzing agent comprising aqueous sodium sulfite to produce 3,20-diketo-17(α),21-dihydroxy-pregnane.

9. The process of preparing 3,11,20-triketo-17(α),21-dihydroxy-pregnane which comprises reacting osmium tetroxide with $\Delta^{17}$-3(α)-hydroxy-11-keto-20-cyano-21-acetoxy-pregnane to form the 17,20-osmate ester of 3(α)17,20-trihydroxy-11-keto-20-cyano-21-acetoxy-pregnane, reacting this compound with chromic acid to produce the 17,20-osmate ester of 3,11-diketo-17,20-dihydroxy-20-cyano-21-acetoxy-pregnane, and reacting this compound with an aqueous solution containing sodium sulfite and potassium bicarbonate for a period of time of at least about fifteen hours.

10. The process of preparing 3,11,20-triketo-17(α)-hydroxy-21-acetoxy-pregnane which comprises reacting osmium tetroxide with $\Delta^{17}$-3(α)-hydroxy-11-keto-20-cyano-21-acetoxy-pregnene to form the 17,20-osmate ester of 3(α),17,20-trihydroxy-11-keto-20-cyano-21-acetoxy-pregnane, reacting this compound with chromic acid to produce the 17,20-osmate ester of 3,11-diketo-17,20-dihydroxy-20-cyano-21-acetoxy-pregnane, and reacting this compound with an aqueous solution containing sodium sulfite and potassium bicarbonate under mild hydrolysis conditions.

11. The process which comprises reacting an oxidizing agent with a 17,20-osmate ester of a 17,20-dihydroxy-pregnane compound having a cyano radical attached to the C-20 carbon atom and having at least one nuclear hydroxy substituent, thereby oxidizing said hydroxy substituent to a keto radical.

12. The process which comprises reacting chromic acid with a 17,20-osmate ester of a 17,20-dihydroxy-pregnane compound having a cyano radical attached to the C-20 carbon atom and having at least one nuclear hydroxy substituent, thereby oxidizing said hydroxy substituent to a keto radical.

13. The process which comprises reacting an oxidizing agent with a 17,20-osmate ester of a 17,20-dihydroxy-20-cyano-21-acyloxy-pregnane compound having at least one nuclear hydroxy substituent thereby oxidizing said nuclear hydroxy substituent to a keto radical without affecting the esterified hydroxy groupings.

14. The process which comprises reacting an oxidizing agent with a 17,20-osmate ester of a 3,17,20-trihydroxy-11-keto-20-cyano-21-acyloxy-pregnane compound thereby oxidizing the 3-hydroxy substituent to a keto radical without affecting the esterified hydroxy groupings.

15. The process which comprises reacting chromic acid with a 17,20-osmate ester of a 3,17,20-trihydroxy-11-keto-20-cyano-21-acyloxy-pregnane compound thereby oxidizing the 3-hydroxy substituent to a keto radical without affecting the esterified hydroxy groupings.

16. The process which comprises reacting the 17,20-osmate ester of 3(α),17,20-trihydroxy-11-keto-20-cyano-pregnane with chromic acid to produce the 17,20-osmate ester of 3,11-diketo-17,20-dihydroxy-20-cyano-pregnane.

17. The process which comprises reacting the 17,20-osmate ester of 3,17,20-trihydroxy-20-cyano-21-acetoxy-pregnane with chromic acid to produce the 17,20-osmate ester of 3-keto-17,20-dihydroxy-20-cyano-21-acetoxy-pregnane.

18. The process which comprises reacting the 17,20-osmate ester of 3(α),17,20-trihydroxy-11-keto-20-cyano-21-acetoxy-pregnane with chromic acid to produce the 17,20-osmate ester of 3,11-diketo-17,20-dihydroxy-20-cyano-21-acetoxy-pregnane.

19. The process of preparing 3,11,20-triketo-17(α)-hydroxy-pregnane which comprises reacting the 17,20-osmate ester of 3,11-diketo-17,20-dihydroxy-20-cyano-pregnane with an aqueous solution containing sodium sulfite and potassium bicarbonate.

20. The process of preparing 3,11,20-triketo-17(α)-hydroxy-21-acetoxy-pregnane which comprises reacting the 17,20-osmate ester of 3,11-diketo-17,20-dihydroxy-20-cyano-21-acetoxy-pregnane with an aqueous solution containing sodium sulfite and potassium bicarbonate under mild hydrolysis conditions.

21. The process of preparing 3,11,20-triketo-17(α)-hydroxy-21-acetoxy-pregnane which comprises reacting the 17,20-osmate ester of 3,11-diketo-17,20-dihydroxy-20-cyano-21-acetoxy-pregnane with an aqueous solution containing sodium sulfite and potassium bicarbonate for a period of time of at least about fifteen hours thereby forming 3,11,20-triketo-17(α)-hydroxy-21-hydroxy-pregnane, and reacting this compound with acetic anhydride to produce 3,11,20-triketo-17(α)-hydroxy-21-acetoxy-pregnane.

22. 3,11,20-triketo-17(α)-hydroxy-21-acetoxy-pregnane.

LEWIS HASTINGS SARETT.

No references cited.